US011178361B2

(12) United States Patent
Arvanitis et al.

(10) Patent No.: US 11,178,361 B2
(45) Date of Patent: Nov. 16, 2021

(54) VIRTUAL WINDOW FOR TELECONFERENCING

(71) Applicant: FORD GLOBAL TECHNOLOGIES, LLC, Dearborn, MI (US)

(72) Inventors: Andreas Arvanitis, Dearborn, MI (US); Matthew Whitaker, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/961,000

(22) PCT Filed: Feb. 1, 2018

(86) PCT No.: PCT/US2018/016457
§ 371 (c)(1),
(2) Date: Jul. 9, 2020

(87) PCT Pub. No.: WO2019/152038
PCT Pub. Date: Aug. 8, 2019

(65) Prior Publication Data
US 2020/0366869 A1 Nov. 19, 2020

(51) Int. Cl.
*H04N 7/15* (2006.01)
*G06F 3/01* (2006.01)
*H04M 3/56* (2006.01)

(52) U.S. Cl.
CPC ............ *H04N 7/157* (2013.01); *G06F 3/013* (2013.01); *H04M 3/567* (2013.01); *H04M 3/568* (2013.01)

(58) Field of Classification Search
USPC ............................................ 348/14.02, 14.08
See application file for complete search history.

(56) References Cited

U.S. PATENT DOCUMENTS

| | | | |
|---|---|---|---|
| 9,787,939 B1 | 10/2017 | Beguin et al. | |
| 2005/0018828 A1* | 1/2005 | Nierhaus | H04M 3/569 379/202.01 |
| 2008/0088624 A1 | 4/2008 | Long et al. | |

(Continued)

FOREIGN PATENT DOCUMENTS

| | | | | |
|---|---|---|---|---|
| GB | WO-201722854 | * | 7/2017 | ............ H04H 60/04 |
| WO | 2017/220854 A1 | | 12/2017 | |

OTHER PUBLICATIONS

International Search Report of the International Searching Authority for PCT/US2018/016457 dated Apr. 19, 2018.

*Primary Examiner* — Maria El-Zoobi
(74) *Attorney, Agent, or Firm* — Brandon Hicks; Eversheds Sutherland (US) LLP

(57) ABSTRACT

Techniques and examples pertaining to a virtual window between two remotely located environments are described. A method for teleconferencing using the virtual window may involve receiving, from a camera, first multimedia data of a first environment. The method may also involve receiving, from a position tracker, position data of a user in a second environment. The method may also involve transforming, based on the position data, the first multimedia data to second multimedia data of the first environment. The method may further involve presenting the second multimedia data to the user such that the user perceives the first environment as being separated from the second environment by a physical window.

20 Claims, 7 Drawing Sheets

(56) References Cited

U.S. PATENT DOCUMENTS

2012/0081503 A1     4/2012   Leow et al.
2014/0375752 A1*   12/2014   Shoemake ............ H04N 7/141
                                                                348/14.07
2019/0149919 A1     5/2019   Mate et al.

\* cited by examiner

VIRTUAL WINDOW FOR TELECONFERENCING

TECHNICAL FIELD

The present disclosure generally relates to video communication and, more particularly, to creating a virtual window between two environments remote from one another for teleconferencing and/or remote monitoring.

BACKGROUND

In the contemporary world of globalization, adoption of teleconference technologies has become ever more prevailing in the realm of business, as well as between family and friends. Through teleconferencing, people at two or more different physical locations, potentially across the globe or often-times remote from each other, can, in a real-time manner, converse, discuss or otherwise communicate with each other while seeing motion, gestures and facial expressions of each participating party. In short, teleconference or similar long-distance collaboration technologies today enable people at two or more different locations, who could not physically meet with each other, to have a "virtual" face-to-face meeting.

Teleconferencing nowadays typically involves use of a screen or display to show or otherwise present a real-time image (i.e., video) of one or more other participating sites. That is, at the location of each of the participating parties of a teleconference (herein referred as "a local site"), a screen or display is typically used to show the video of one or more participating parties at other locations (herein referred as "remote sites"). The video of a remote site, although changing in substantially a real-time manner along with the party at the remote site, however, falls short from being perceived by the party at the local site as realistic as seeing the party at the remote site "face to face". This is manifested as a major disadvantage of the current state of teleconference technologies because casual interaction and immersive collaboration, as two important elements in face-to-face meetings, are missing this less-than-real perception or experience of the remote site video. That is, the fact that a user at a local site does not feel or otherwise perceive that he or she appears to be meeting face-to-face with people at a remote site can constitute a major limitation of existing teleconferencing technologies.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

As described above, existing teleconference technologies fall short from providing a realistic video experience, adversely affecting many aspects of a teleconference including casual interaction and immersive collaboration. The authors of the present application would like to point out that this major limitation of teleconferencing today may result from the fact that a video of a remote site is being presented on a display at a local site (also referred as "a local environment") with a fixed field of view (FOV). A FOV of an image is an angular extent of the image as seen by a camera generating the image. A FOV of an image is usually defined in a horizontal direction of the image, but may alternatively or additionally be defined in a vertical direction of the image.

A painting on a wall or a picture in a magazine are two examples of a visual presentation having a fixed FOV. Regardless how high resolution a painting or a picture may be, they would not be perceived as "real", because a FOV of the painting or the picture does not change with respect to a location of a viewer looking at the painting or the picture. It's a similar situation for a video of teleconferencing, albeit the time-varying essence of a video in teleconferencing as compared to the time-invariant essence of a painting or a picture. That is, a video of a remote site (also referred as "a remote environment") still presents itself with a fixed FOV to a user at a local site, and thus the user of the local site would not be enabled by the video to feel or otherwise perceive the video of the remote site as one that is more realistic.

The present application proposes methods and apparatuses by which a realistic teleconference experience may be generated or otherwise facilitated. In particular, the methods and apparatuses may create a user experience for a user at a local site such that the user feels or otherwise perceives the video of the remote site as if the user is looking through a physical window at the remote site. That is, the user at the local site may perceive the remote site as being separated from the local site by the physical window, although in reality the remote site may be far away from the local site.

Figure 1:
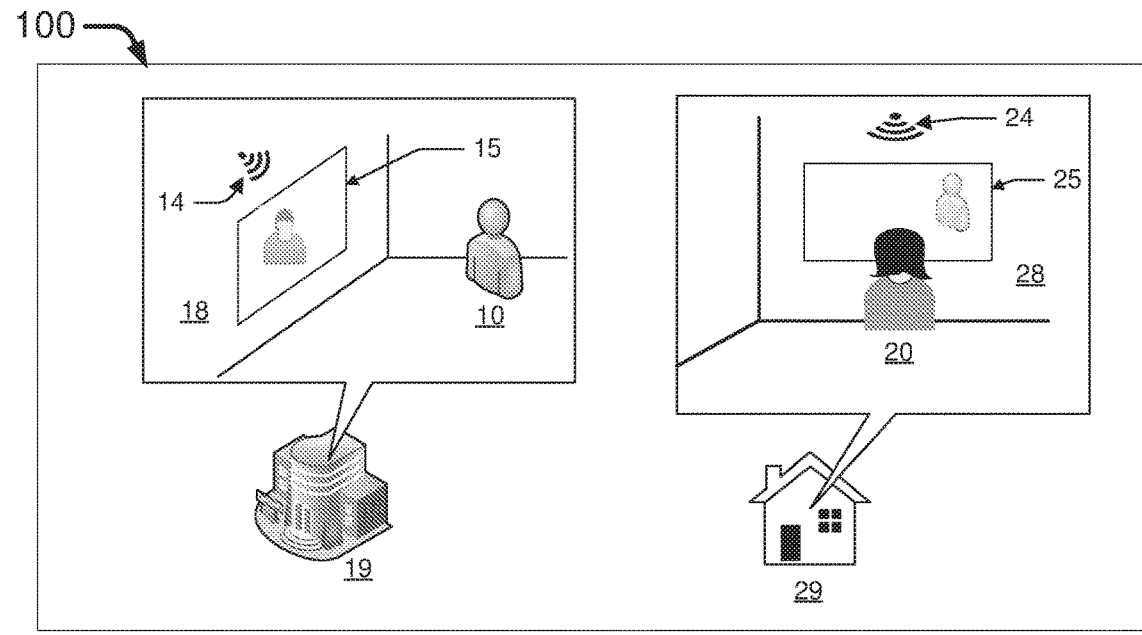
FIG. 1 is a diagram depicting an example scenario in which embodiments in accordance with the present disclosure may be utilized.
Figure 1:
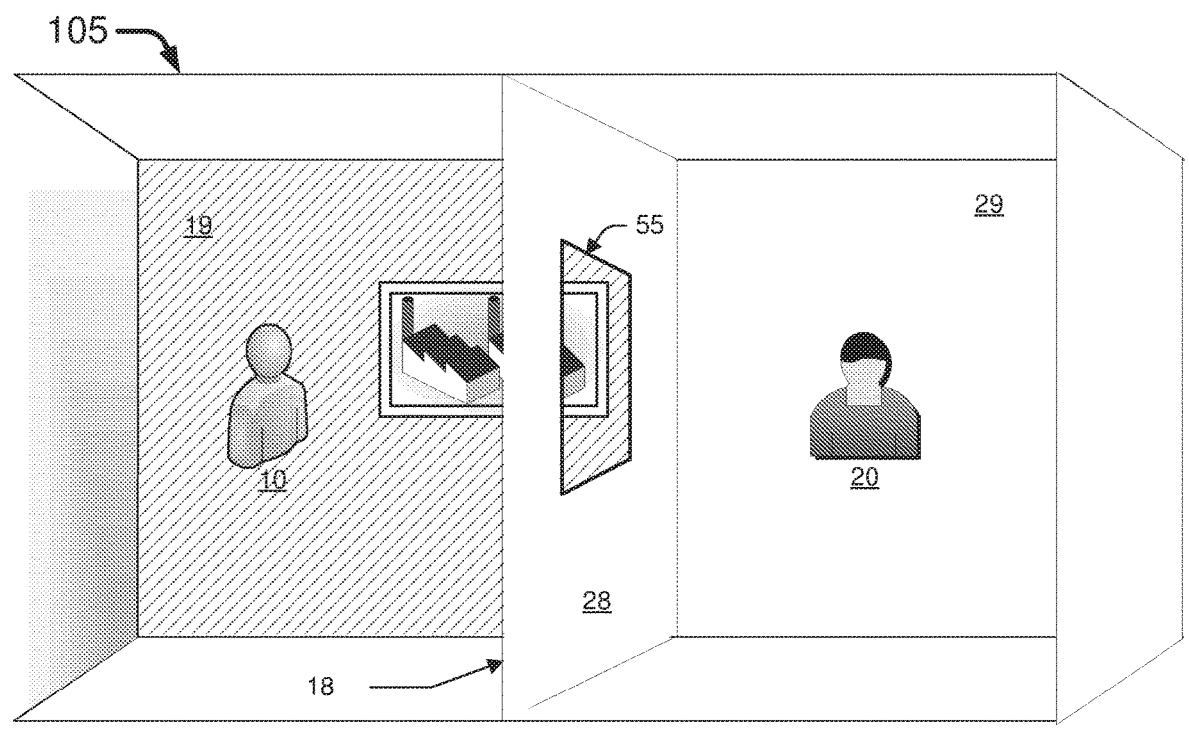

Various embodiments described in the present disclosure may be applied to an example scenario 100 depicted in FIG. 1. Scenario 100 may include a remote site, i.e., office 19, as a first environment of a teleconference. Scenario 100 may also include a local site, i.e., house 29, as a second environment of the teleconference. A participant 10 may be located in office 19, whereas a participant 20 may be located in house 29. Office 19 and house 29 may be physically located far from one another, and thus the teleconference may be needed to facilitate a virtual meeting between participant 10 and participant 20. Namely, there may be two parties, participant 10 and participant 20, who participate in the teleconference.

At each site, there may be a screen or visual display on which a real-time video of the opposite participating party may be shown or otherwise displayed. That is, at office 19, display 15 disposed on wall 18 may show to participant 10 a real-time video of participant 20. Similarly, at house 29, display 25 disposed on wall 28 may show to participant 20 a real-time video of participant 10.

Furthermore, the real-time video of participant 10 may be captured, recorded or otherwise generated by a camera 14 in office 19, whereas the real-time video of participant 20 may be captured, recorded or otherwise generated by a camera 24 in house 29. Each of cameras 14 and 24 is typically a wide-angle video camera, having a FOV of substantially 180 degrees or even 360 degrees in either or both of a horizontal direction and a vertical direction of office 19 or house 29.

It is worth noting that a type of a camera and a location of the camera may be combined to realize an effective shooting of the video used in a teleconference. That is, each of cameras 14 and 24 may be disposed in a strategic location in office 19 and house 29, respectively, depending on a type of the camera. For example, camera 24 may have a 180-degree FOV in the horizontal direction of house 29, and may thus be mounted on wall 28 close to display 25, from which location camera 24 may effectively capture the video of participant 20, along with other objects or people in house 29, during the teleconference. Likewise, camera 14 may have a 360-degree FOV in the horizontal direction of office 19, and may thus be mounted on a ceiling of office 19, or on a post in the middle of office 19, from which location camera 14 may effectively capture the video of participant 10, along with other objects or people in office 19, during the teleconference.

Various embodiments of the present application, as entailed below, may result in a perception 105 shown in FIG. 1, in which participant 10 and participant 20 may perceive one another as being on the other side of a virtual window 55. Namely, participant 10 in office 19 may perceive participant 20, as well as house 29, as being on the other side of virtual window 55 that is mounted on wall 18 of office 19 in a place of display 15. Likewise, participant 20 in house 29 may perceive participant 10, as well as office 19, as being on the other side of virtual window 55 that is mounted on wall 28 of house 29 in a place of display 25. That is, participant 10 may perceive virtual window 55 as having a physical dimension (i.e., a size) that is the same as that of display 15, whereas participant 20 may perceive virtual window 55 as having a physical dimension (i.e., a size) that is the same as that of display 25.

Figure 2:
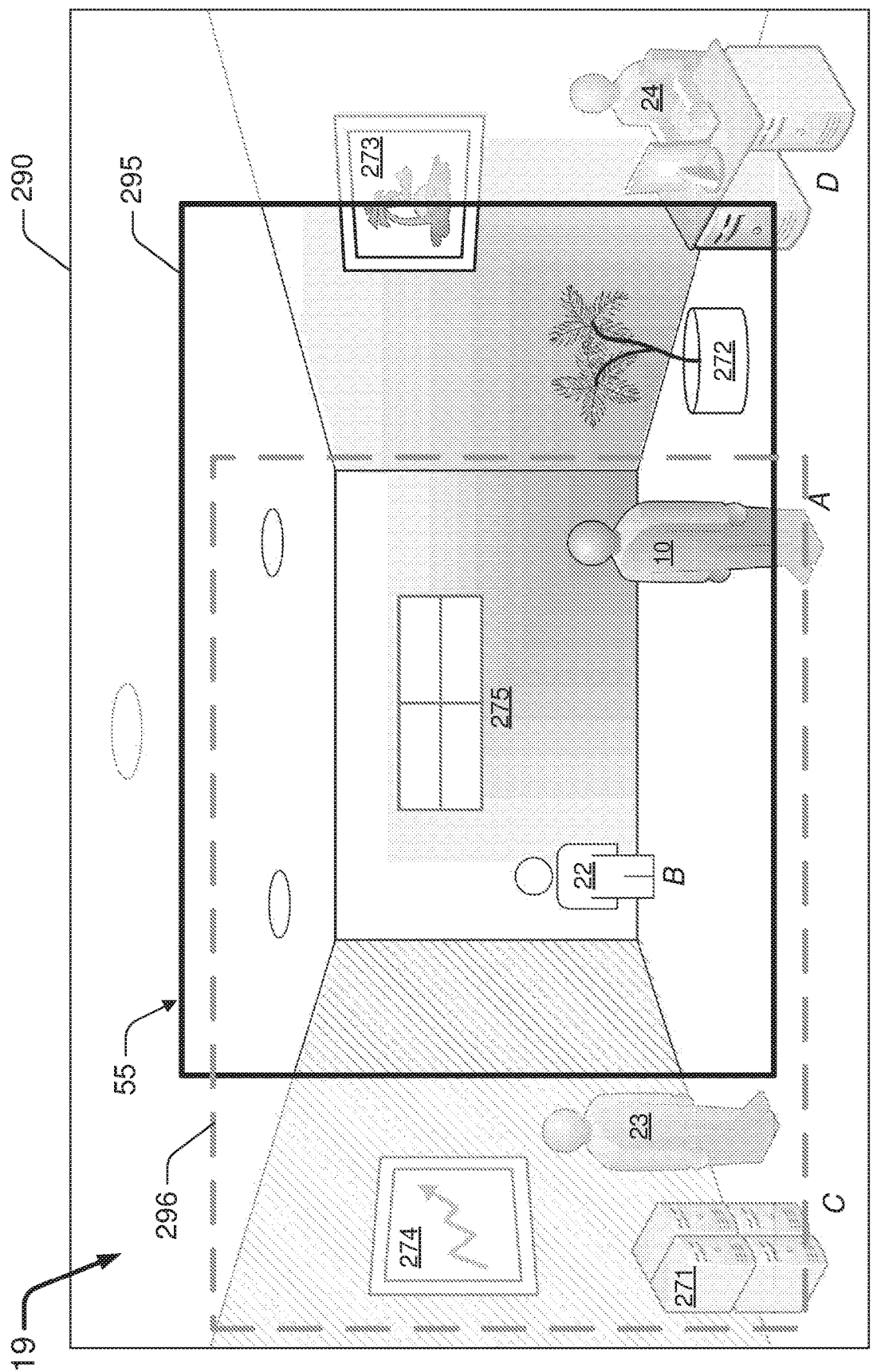
FIG. 2 is a diagram illustrating a concept of a virtual window in accordance with the present disclosure.

FIG. 2 illustrates how user 20 in house 29 may, with an embodiment of the present application, see a realistic view of office 19 through virtual window 55 during a teleconference between a party in office 19 and a party in house 29, as shown in perception 105 of FIG. 1. Rectangle 290 of FIG. 2 may encompass every object, people included, in office 19 of FIG. 1. As shown in rectangle 290 of FIG. 2, in office 19, there may be participant 10 of FIG. 1, along with three other people (i.e., workers 22, 23 and 24). Worker 22 may be standing at a location B of office 19, next to a window 275. Worker 23 may be standing next to a teleconferencing server 271 which is at location C of office 19. Worker 24 may be sitting at a desk at location D of office 19. In addition, in office 19, there may also be a plant 272 that is placed on a floor of office 19, a painting 273 hung on a wall of office 19, as well as a graphic chart 274 hung on another wall of office 19.

Figure 3:
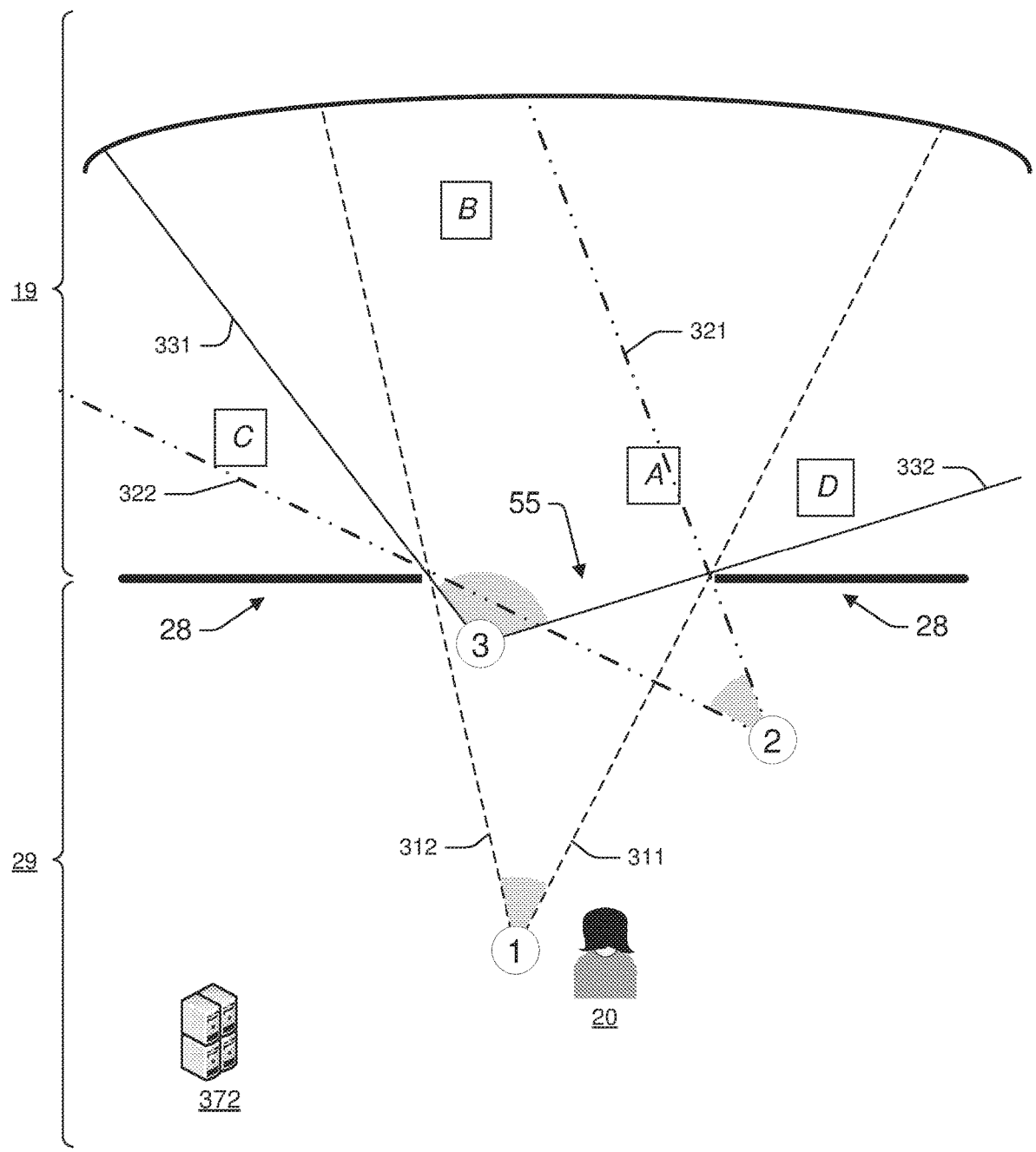
FIG. 3 is a diagram illustrating another concept of a virtual window in accordance with the present disclosure

FIG. 3 illustrates a top view of perception 105 of FIG. 1. Namely, FIG. 3 represents perception 105 as seen from a ceiling of office 19 or house 29. In addition, FIG. 3 illustrates three locations (i.e., locations labeled as 1, 2 and 3 in FIG. 3) of participant 20 in house 29. Moreover, FIG. 3 illustrates a respective FOV of office 19 that participant 20 may see, through virtual window 55, at each of the three locations. That is, when participant 20 is at location 1, participant 20 may see, through virtual window 55, a FOV of office 19 as defined by an area between lines 311 and 312 of FIG. 3. When participant 20 is at location 2, participant 20 may see, through virtual window 55, a FOV of office 19 as defined by an area between lines 321 and 322 of FIG. 3. When participant 20 is at location 3, participant 20 may see, through virtual window 55, a FOV of office 19 as defined between lines 331 and 332. It is worth noting that the FOV as defined by an area between lines 311 and 312 of FIG. 3 is equivalent to the FOV as defined within rectangle 295 of FIG. 2. It is also worth noting that locations labeled as "A", "B" and "C" in FIG. 3 correspond to locations A, B and C of office 19 as shown in FIG. 2.

During the teleconference, participant 20 in house 29 may be having a conversation with participant 10 in office 19 while participant 20 is at a particular location of house 29 (e.g., location 1 of FIG. 3). Participant 20 may be able to see participant 10 through virtual window 55 as participant 10 is presented on display 25. In fact, through virtual window 55, participant 20 may be able to see a portion of office 19 that is within rectangle 295 of FIG. 2. Namely, rectangle 295 may represent a FOV of office 19 as seen by participant 20 from house 29 through virtual window 55 when participant is at location 1 of FIG. 3. With the FOV represented by rectangle 295 of FIG. 2, participant 20 may see, through virtual window 55, everything within rectangle 295. That is, through virtual window 55, participant 20 may see participant 22, plant 272, window 275, part of participant 10 and a half of painting 273 from location 1 shown in FIG. 3. However, from location 1 of FIG. 3, participant 20 would not be able to see objects or people that are outside rectangle 295 of FIG. 2. That is, through virtual window 55, participant 20 would not be able to see at least participant 23, participant 24, teleconferencing server 271, graphic chart 274 and part of painting 273, as they are blocked by wall 28 and thus not within the FOV.

As the teleconference proceeds, participant 23 in office 19 may want to show graphic chart 274 to participant 10 in house 29. It would be impossible, however, for participant 23 to show graphic chart 274 to participant 10 if participant 10 would remain at location 1 of FIG. 3. This is because graphic chart 274 would be outside the FOV of office 19 represented by rectangle 295 of FIG. 2 or the area between lines 321 and 322 of FIG. 3. Nevertheless, as participant 20 moves within house 29 relevant to display 25, the FOV of office 19 as participant 20 sees through virtual window 55 may also change to include graphic chart 274 and even participant 23. In particular, as participant 20 moves from location 1 of FIG. 3 to location 2 of FIG. 3, the FOV would change from the area between lines 311 and 312 to the area between lines 321 and 322 to include graphic chart 274 and even participant 23. The resulted FOV may be equivalently represented by rectangle 296 of FIG. 2.

By considering differences, in view of FIGS. 1-3, between existing teleconferencing technologies and the present disclosure, the limitation of existing teleconferencing technologies (i.e., the inability to provide a realistic user experience) may be understood. Existing teleconferencing technologies may employ a camera disposed in a remote site (e.g., camera 14 in office 19) that has a fixed FOV. During a teleconference between the remote site and a local site, the camera may take or otherwise capture a real-time video of the remote site with the fixed FOV (e.g., rectangle 295), and the video may be presented on a display disposed in the local site. However, with existing teleconferencing technologies, the video is presented with the FOV as taken by the camera. Namely, the FOV of the video as presented on the display to a user in the local site is fixed and will not change according to a location of the user relative to the display. Given that a view through an actual window has a changing FOV according to a location of an observer relative to the window, the user of existing teleconferencing technologies at the local site will not perceive the video of the remote site as realistic as if the user is seeing the remote site through a window, giving rise to the major limitation or shortcoming of existing teleconference technologies.

In contrast, according to the present disclosure and in view of FIGS. 1-3, camera 14 is a wide-angle camera capable of generating a multimedia data (referred as "a first multimedia data") that essentially captures every object and person in office 19. In some embodiments, the first multimedia data may include a video stream (referred as "first video stream") comprising a plurality of video frames (referred as "first video frames") that are continuous in time during a period of a teleconference conducted between office 19 and house 29. Since the video stream is generated by camera 14, each of the first video frames would have a FOV (i.e., shown as rectangle 290 of FIG. 2; referred as "a first FOV") that is the same as camera 14, also encompassing every object and person in office 19.

The first multimedia data may then be processed or otherwise transformed in to a second multimedia data. The second multimedia data may include a second video stream comprising a plurality of second video frames that are continuous in time. Each of the second video frames is framed, cropped, panned, scaled and/or tilted from a corresponding one of the first video frames. Moreover, the framing, cropping, panning, scaling and/or tilting are performed based on a second FOV that is normally smaller than the first FOV, such as rectangle 295 of FIG. 2. In some embodiments, the second FOV is determined based on a location of participant 20 relative to display 25, such as locations 1, 2 or 3 as shown in FIG. 3. For example, if participant 20 is located at location 1, then the second FOV is determined to be the area between lines 311 and 312, of FIG. 3, based on how location 1 is located relative to display 25, which is at a position of virtual window 55 of FIG. 3). If participant 20 is located at location 2, then the second FOV is determined to be the area between lines 321 and 322, of FIG. 3, based on how location 2 is located relative to display. As the second multimedia data is presented on display 25 in house 29, participant 20 may perceive office 19 as being separated from house 29 by merely a physical window, illustrated as perception 105 of FIG. 1.

The location of participant 20 relative to display 25 may be known or otherwise tracked by a position tracker. That is, the position tracker may generate a position data of participant 20, which includes a location of participant 20 relative to display 25. In some embodiments, the position tracker may include a wireless transmitter carried by or otherwise disposed on participant 20 during the teleconference. The wireless transmitter may periodically transmit a wireless beacon signal that may be received by one or more receivers disposed on or near display 25. Based on the different signal strength of beacon signal received by each of the receivers, the location of participant 20 may be determined as the position data.

In some embodiments, the first multimedia data recorded or otherwise captured by camera 14 may also include a multi-channel audio signal capturing sounds from office 19 during the teleconference. The multi-channel audio signal may include two or more audio channels that may capture sounds of office 19 in various directions. In the perception 105 of FIG. 1, participant 20 may hear sounds of office 19 differently depending on not only the location but also a head direction of participant 20 relative to display 25. For example, when participant 20 is at location 3 of FIG. 3 with a head direction pointing toward virtual window 55 (i.e., display 25) along a line toward location D of FIG. 2 or 3, participant 20 would hear participant 24 better than he/she would hear participant 22. However, when participant 20 is at location 3 of FIG. 3 with a head direction pointing toward virtual window 55 (i.e., display 25) along a line toward location B of FIG. 2 or 3, participant 20 would hear participant 22 better than he/she would hear participant 24. Therefore, before presented on display 25 to participant 20, the multi-channel audio signal may also be adjusted or otherwise transformed based on the head direction of participant 20 relative to display 25, which is transmitted by the position tracker as part of the location data. That is, the two or more audio channels of the multi-channel audio signal may need to be mixed to achieve a balance level that is suitable to the head direction of participant 20.

In addition to the location of participant 20 relative to display 25 in house 29, a gaze direction of an eye of participant 20 relative to display 25 may also affect the second FOV, i.e., the FOV of office 19 as seen by participant 20 through virtual window 55. For example, with participant 20 at location 3 of FIG. 3, the second FOV may change when participant 20 changes his or her gaze from toward painting 273 to toward graphic chart 274. Therefore, in some embodiments, the position data of participant 20, as captured or otherwise tracked by a position tracker, may include a gaze direction of participant 20 relative to display 25. Therefore, the second FOV may be determined also based on the gaze direction of participant 20. For instance, in some embodiments, the wide-angle video camera 14 in office 19 may include a stereoscopic camera, a light-field camera or other types of three-dimensional (3D) camera. The gaze direction of participant 20 may thus be used to determine a location of focus within the second FOV (i.e., where in the second FOV to focus sharply, as shown on display 24).

Description above regarding the teleconference between office 19 and house 29 according to the present application has been conducted assuming that office 19 be the remote site (transmitting video) and house 29 be the local site (receiving video). However, a teleconference is seldom conducted with only one-way communication, but instead constitutes a two-way communication between the two ends of the teleconference. That is, in an actual teleconference between office 19 and house 29, both office 19 and house 29 may be a local site and also a remote site at the same time with respect to one another. In an event that house 29 be the remote site and office 19 be the local site, all the description above regarding the remote site and the local site may to be exchanged.

It is unambiguous who a participant from the local site is in an event that there is only one potential user at the local site who might participate in the teleconference. However, in an event that there are multiple people at the local site (e.g., house 29 being the remote site and office 19 being the local site), an extra step is necessary to determine which person out of the multiple people may be the participant whose position data may be used in transforming the first multimedia data to the second multimedia data, generating a virtual window such as window 55 of FIGS. 1-3. For example, in an event that office 19 is the remote site, each of the four people in office 19—numerically labeled as 10, 22, 23 and 24 in FIG. 2—may be a potential participant who participates in the teleconference. Therefore, it is necessary to determine one out of the four people as a main participant of the teleconference, and the position data of the main participant may be used in transforming the first multimedia data to the second multimedia data. Various algorithms may be used to determine who the main participant is. For example, it may be the person who at the moment is located closer to display 15 than the rest of the potential participants. Alternatively, it may be the person who at the moment is speaking, or who is speaking louder than the rest of the potential participants.

For each way of a two-way teleconference using a virtual window, a transmitter and a receiver may be needed on each end of the teleconference. For example, each of office 19 and house 29 of FIG. 1 may be required to have a transmitter for transmitting multimedia data and a receiver for receiving multimedia data. Specifically, office 19 may need a transmitter for transmitting a video of office 19 to house 29, as well as a receiver for receiving a video of house 29 from house 29. Likewise, house 29 may need a transmitter for transmitting a video of house 29 to office 19, as well as a receiver for receiving a video of office 19 from office 19. In some embodiments, the transmitter and the receiver may be combined or otherwise integrated into a single device, a transceiver, that can both transmit and receive multimedia data, such as transceiver 400 of FIG. 4. A transceiver may include several components, but not all of the components of the transceiver may be active in both transmitting and the receiving multimedia data, as explained below.

Figure 5:
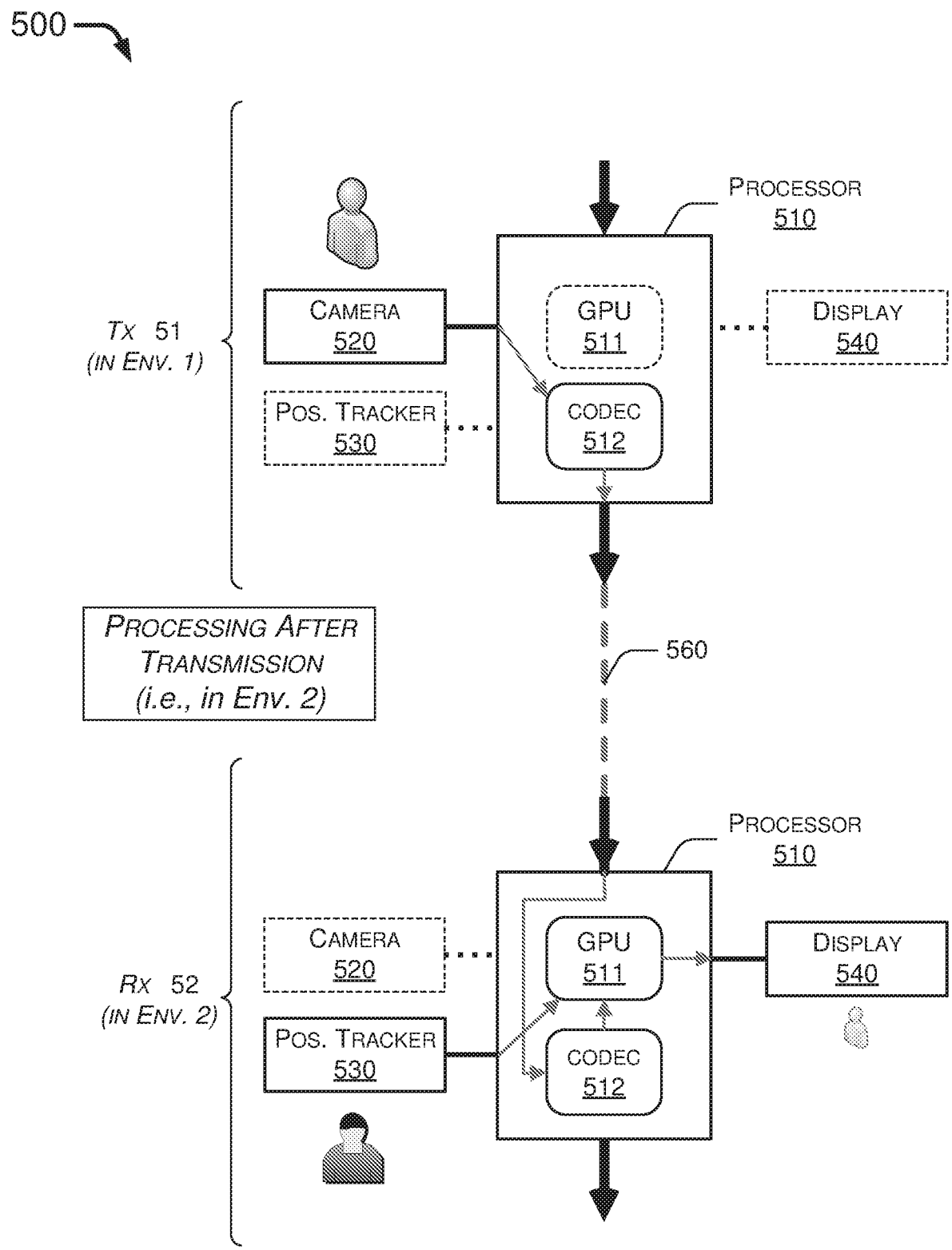
FIG. 5 is a block diagram depicting an example operation scheme in accordance with an embodiment of the present disclosure.
Figure 6:
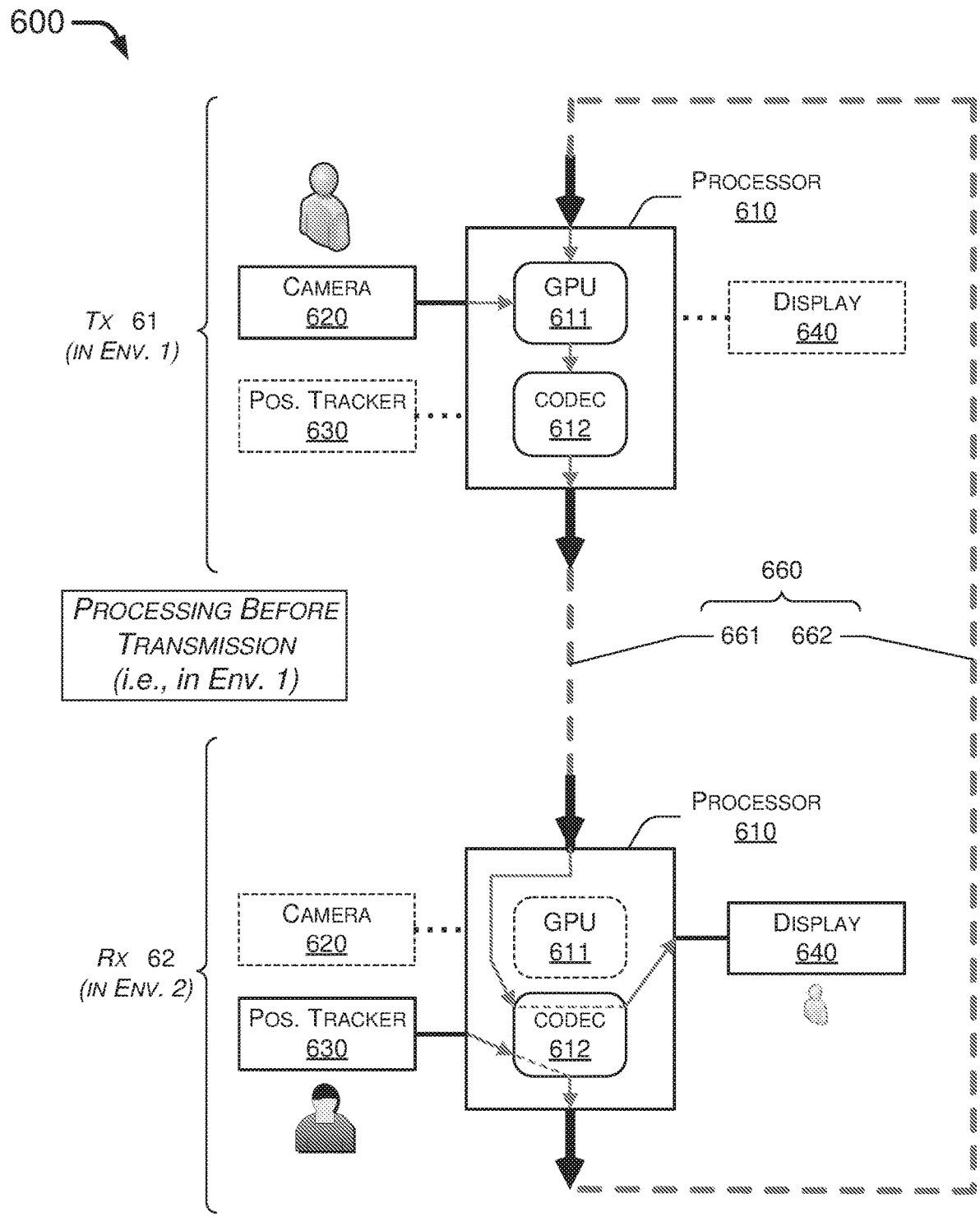
FIG. 6 is a block diagram depicting another example operation scheme in accordance with an embodiment of the present disclosure.

Teleconferencing with a virtual window (e.g., virtual window 55 of FIGS. 1-3) according to the present disclosure may be implemented in one of two operation schemes: processing-after-transmission scheme 500 as shown in FIG. 5 and processing-before-transmission scheme 600 as shown in FIG. 6. Scheme 500 may involve a transmitter (herein interchangeably referred as "Tx") 51 and a receiver (herein interchangeably referred as "Rx") 52. Likewise, scheme 600 may involve a Tx 61 and a receiver Rx 62.

As shown in processing-after-transmission scheme 500 of FIG. 5, Tx 51 may include a camera 520 and a data communication circuit, codec 512. Rx 52 may include codec 512, a graphics processing unit (GPU) 511, a position tracker 530, as well as a display 540. Consequently, Tx 51 and Rx 52 may both be implemented by a transceiver that includes camera 520, position tracker 530, display 540 and a processor 510 containing GPU 511 and codec 512. Specifically, when functioning as Tx 51, the transceiver may have camera 520 and codec 512 active, while having GPU 511, position tracker 530 and display 540 inactive. On the other hand, when functioning as Rx 52, the transceiver may have GPU 511, codec 512, position tracker 530 and display 540 active, while having camera 520 inactive. Furthermore, the transceiver may be embodied by transceiver 400 of FIG. 4. That is, processor 410 of FIG. 4 may be processor 510 of FIG. 5, GPU 411 of FIG. 4 may be GPU 511 of FIG. 5, codec 412 of FIG. 4 may be codec 512 of FIG. 5, camera 420 of FIG. 4 may be camera 520 of FIG. 5, position tracker 430 of FIG. 4 may be position tracker 530 of FIG. 5, and display 440 of FIG. 4 may be display 540 of FIG. 5.

As shown in processing-before-transmission scheme 600 of FIG. 6, Tx 61 may include a camera 620 and a processor 610 containing a GPU 611 and a data communication circuit, codec 612. Rx 62 may include codec 612, a position tracker 630, as well as a display 640. Consequently, Tx 61 and Rx 62 may both be implemented by a transceiver that includes camera 620, position tracker 630, display 640 and a processor 610 containing GPU 611 and codec 612. Specifically, when functioning as Tx 61, the transceiver may have camera 620, GPU 611 and codec 612 active, while having position tracker 630 and display 640 inactive. On the other hand, when functioning as Rx 62, the transceiver may have codec 612, position tracker 630 and display 640 active, while having camera 620 and GPU 611 inactive. Furthermore, the transceiver may also be embodied by transceiver 400 of FIG. 4. That is, processor 410 of FIG. 4 may be processor 610 of FIG. 6, GPU 411 of FIG. 4 may be GPU 611 of FIG. 6, codec 412 of FIG. 4 may be codec 612 of FIG. 6, camera 420 of FIG. 4 may be camera 620 of FIG. 6, position tracker 430 of FIG. 4 may be position tracker 630 of FIG. 6, and display 440 of FIG. 4 may be display 640 of FIG. 6.

Figure 4:
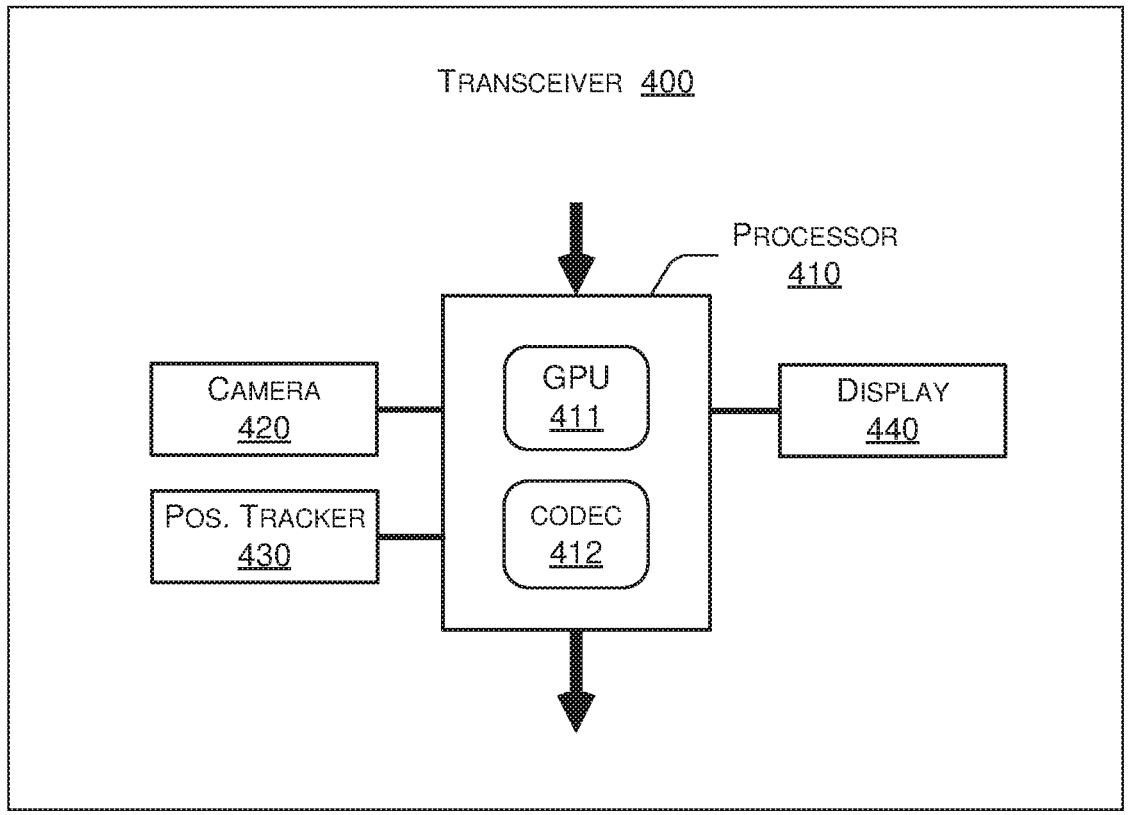
FIG. 4 is a block diagram depicting an example apparatus in accordance with an embodiment of the present disclosure.

In summary, all of Tx 51, Rx 52, Tx 61 and Rx 62 of FIGS. 5 and 6 may be embodied by transceiver 400 of FIG. 4. Moreover, camera 420 may embody camera 14 or 24 of FIG. 1, and display 440 may embody display 15 or 25 of FIG. 1.

Process 500 of FIG. 5, i.e., the "processing-after-transmission" process, may be explained by the following example. In the example, Tx 51 may be located in a remote site, office 19 and Rx 52 in a local site, house 29. Processor 510 of Tx 51 (in particular, codec 512 therein) may receive a video of office 19 from camera 520 of Tx 51 (i.e., camera 14 of FIG. 1) as first multimedia data. The first multimedia data may be encoded by codec 512 of Tx 51 and then sent to Rx 52 via data link 560 that connects processor 510 of Tx 51 to a processor 510 of Rx 52. Processor 510 of Rx 52 (in particular, codec 512 therein) may receive the encoded first multimedia data from Tx 51 via data link 560, and subsequently decode the encoded first multimedia data to obtain the video of office 19 as captured by camera 520 of Tx 51. Processor 510 of Rx 52 (in particular, GPU 511 therein) may also receive a position data of a user (i.e., participant 20) in house 29 of FIG. 1 from Rx 52. In fact, the position data of participant 20 may be tracked by position tracker 530 of Rx 52. In addition, GPU 511 may subsequently transform the first multimedia data (i.e., data presenting everything in rectangle 290 of FIG. 2) to second multimedia data (i.e., data presenting everything within rectangle 295 or 296 of FIG. 2) based on the position data of participant 20. GPU 511 may then present the second multimedia data to participant 20 by presenting the second multimedia data as a virtual window (e.g., virtual window 55 of FIGS. 1-3) to participant 20, possibly by showing the second multimedia data on display 540 of Rx 52 (i.e., display 25 of FIG. 1). Due to the second multimedia data that is being constantly updated according to the position data of participant 20, participant 20 may thus perceive office 19 as being separated from house 29 by virtual window 55 that has a size of, and is in a place of, display 25.

Process 600 of FIG. 6, i.e., the "processing-before-transmission" process, may be explained by the following example. In the example, Tx 61 may be located in a remote site, office 19 and Rx 62 in a local site, house 29. Processor 610 (in particular, GPU 611) of Tx 61 may receive a video of office 19, captured by camera 620 of Tx 61 (i.e., camera 14 of FIG. 1), from camera 620 of Tx 61 as first multimedia data. Processor 610 (in particular, GPU 611) of Tx 61 may further receive position data of a user (e.g., participant 20 in house 29) relative to display 640 of Rx 62 via processor 610 of Rx 62 and a sub link 662 of data link 660 that connects between processor 610 of Rx 62 and processor 610 of Tx 61. In addition, GPU 611 may subsequently transform the first multimedia data (i.e., data presenting everything in rectangle 290 of FIG. 2) to second multimedia data (i.e., data presenting everything within rectangle 295 or 296 of FIG. 2) based on the position data of participant 20. Processor 610 (in particular, codec 612 therein) of Tx 61 may encode the second multimedia by codec 612 of Tx 61 and then send the encoded second multimedia to Rx 62 via sub link 661 of data link 660 that connects between processor 610 of Tx 61 and processor 610 of Rx 62. Processor 610 of Rx 62 may then decode the encoded second multimedia to obtain the second multimedia data transformed by GPU 611 of Tx 61. Processor 610 may subsequently present the second multimedia data to participant 20 by presenting the second multimedia data as a virtual window (e.g., virtual window 55 of FIGS. 1-3) to participant 20, possibly by showing the second multimedia data on display 640 of Rx 62 (i.e., display 25 of FIG. 1). Due to the second multimedia data that is being constantly updated according to the position data of participant 20, participant 20 may thus perceive office 19 as being separated from house 29 by virtual window 55 that has a size of, and is in a place of, display 25.

Process 500, as compared with process 600, has an advantage of suffering less latency in the teleconferencing system. This is because process 500 does not require the position data of participant 20, as tracked by position tracker 530 of Rx 52, to be transmitted from Rx 52 to Tx 51, across a data link, which may be slow. Namely, GPU 511 of Rx 52 may generate the virtual window with position data of participant 20 readily available from position tracker 530 of Rx 52. In contrast, in process 600, position data of participant 20, as tracked by position tracker 630 of Rx 62, is required to be sent from Rx 62 to Tx 61 via sub link 662 of data link 660, such that GPU 611 of Tx 61 may be able to generate the virtual window with position data of participant 20. The transmission of the position data of participant 20 from Rx 62 to Tx 61 may be slow due to quality of sub link 662, thereby increasing the latency of the teleconferencing system.

It is worth noting that, in the present disclosure, multimedia data of a local site may be interchangeably referred as "local data", whereas multimedia data of a remote site may be interchangeably referred as "remote data". In addition, a local site may be interchangeably referred as "a local environment", whereas a remote site may be interchangeably referred as "a remote environment".

Figure 7:
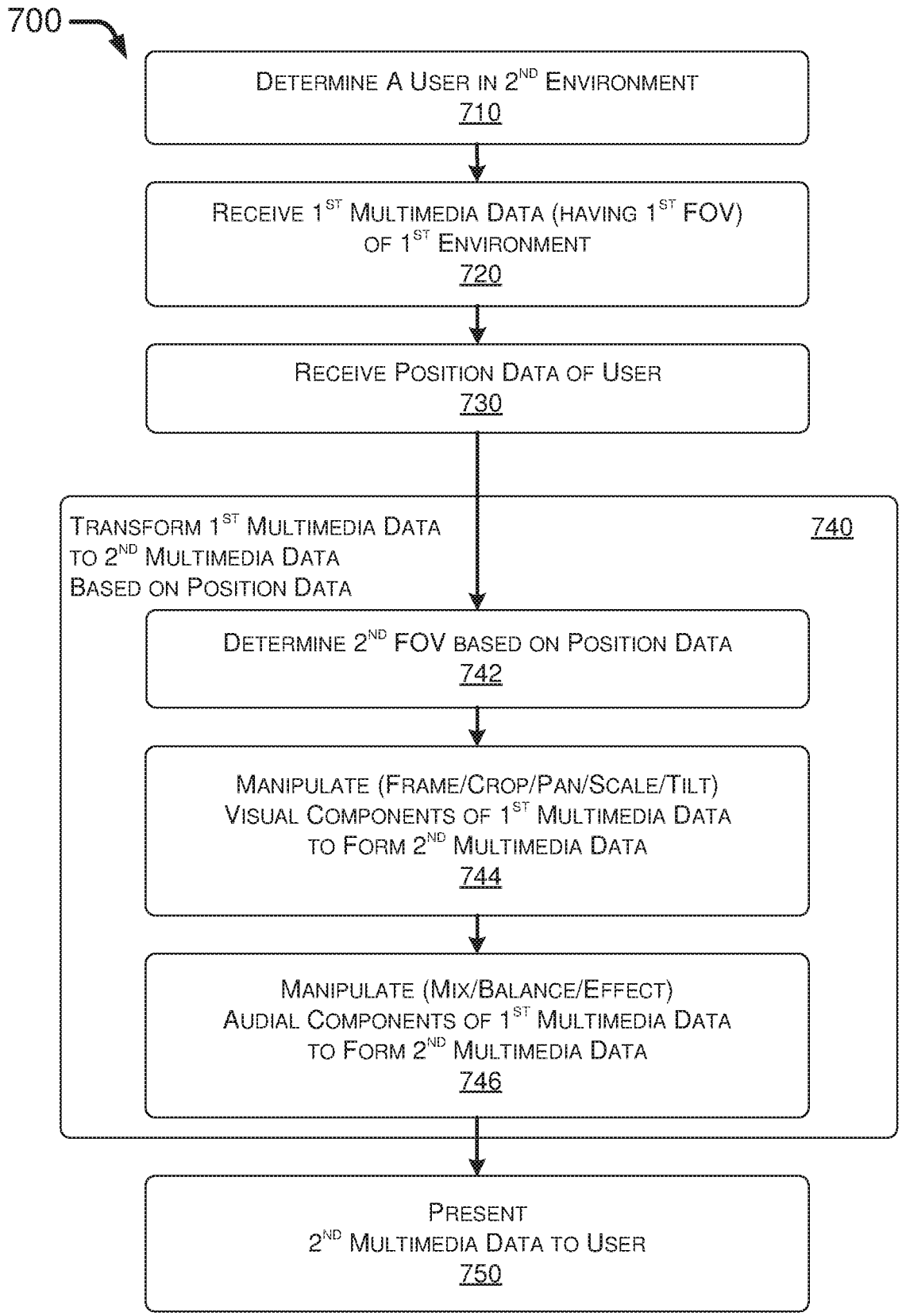
FIG. 7 is a flowchart depicting an example process in accordance with an embodiment of the present disclosure.

FIG. 7 illustrates a flowchart depicting an example process 700 in accordance with an embodiment of the present disclosure. Process 700 may include one or more operations, actions, or functions shown as blocks such as 710, 720, 730, 740, 742, 744, 746 and 750 of FIG. 7. Although illustrated as discrete blocks, various blocks of process 700 may be divided into additional blocks, combined into fewer blocks, or eliminated, depending on the desired implementation. Process 700 may begin at block 710.

At 710, process 700 may involve a processor on determining a user in a local or first environment (e.g., participant 20 in house 29 of FIG. 1). Process 700 may proceed from 710 to 720.

At 720, process 700 may involve receiving first multimedia data of a first environment (e.g., a video of office 19 of FIG. 1) from a camera (e.g., camera 14 of FIG. 1). The camera may be a wide-angle video camera disposed in the first environment and having a first FOV (e.g., encompassing each object and people within rectangle 290 of FIG. 2). The first multimedia data may include a first video stream comprising a plurality of first video frames continuous in time, and each of the plurality of first video frames may have the first FOV. Process 700 may proceed from 720 to 730.

At 730, process 700 may involve receiving position data of a user in a second environment (e.g., participant 20 in house 29) from a position tracker. For example, the position data of participant 20 in house 29 may be tracked by a position tracker disposed in house 29. In some embodiments, the position data may include a location of participant 20 relative to display 25 in house 29. In some embodiments, the position data may also include a gaze direction of an eye of participant 20 relative to display 25, a head location of participant 20 relative to display, or both. Process 700 may proceed from 730 to 740.

At 740, process 700 may involve transforming, based on the position data, the first multimedia data (e.g., a video of office 19 having a FOV of rectangle 290) to second multimedia data of the first environment (e.g., a video of office 19 having a FOV of rectangle 295 or 296). Block 740 may include sub-blocks 722. 744 and 746. Specifically, process 700 may proceed from 730 to 742.

At sub-block 742, process 700 may involve determining, based on the position data, a second FOV (e.g., encompassing each object and people within rectangle 295 or 296 of FIG. 2) for each of a plurality of first video frames. In addition, the second FOV may be smaller than the first FOV. Process 700 may proceed from sub-block 742 to sub-block 744.

At sub-block 744, process 700 may involve manipulating various visual components of first multimedia data, by ways of one or more of framing, cropping, panning, scaling and tilting each of the plurality of first video frames, to form a respective one of a plurality of second video frames based on the second FOV. The second multimedia data comprises a second video stream comprising the plurality of second video frames continuous in time. Process 700 may proceed from sub-block 744 to sub-block 746.

At sub-block 746, process 700 may involve manipulating various audial components of first multimedia data, by ways of one or more of mixing, balancing and effecting one or more of the audio components to form the second multimedia data. Process 700 may proceed from sub-block 746 to block 750.

At block 750, process 700 may involve presenting the second multimedia data to the user (e.g., showing to participant 20 every object or people within rectangle 295 or 296 on display 25) as a virtual window (e.g., virtual window 55). The user may thus perceive the first environment as being separated from the second environment by a physical window that is of a size of the display in the second environment.

In the above disclosure, reference has been made to the accompanying drawings, which form a part hereof, and in which is shown by way of illustration specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

The invention claimed is:

1. A method, comprising:
receiving, from a camera, first multimedia data of a first environment;

receiving, from a position tracker, first position data of a first user in a second environment and second position data of a second user in the second environment;
determining, at a first time, that the first user is a main participant;
transforming, based on the first position data, the first multimedia data to second multimedia data of the first environment, wherein the first position data is used based on determining that the first user is the main participant; and
presenting, on a display in the second environment, the second multimedia data to the first user and the second user such that the first user and second user perceive the first environment as being separated from the second environment by a physical window.

2. The method of claim 1, wherein the position tracker is a wireless transmitter associated with the user, wherein the position data comprises a location of the user relative to a display in the second environment, wherein the position data is determined based on a signal strength between the wireless transmitter and a wireless receiver associated with the display in the second environment, and wherein the presenting of the second multimedia data comprises presenting the second multimedia data on the display.

3. The method of claim 1, wherein:
the camera comprises a wide-angle video camera disposed in the first environment and having a first field-of-view (FOV),
the first multimedia data comprises a first video stream comprising a plurality of first video frames continuous in time, each of the plurality of first video frames having the first FOV, and
the transforming of the first multimedia data comprises determining a second FOV for each of the plurality of first video frames, the second FOV being smaller than the first FOV.

4. The method of claim 3, wherein:
the position data comprises a location of the user relative to a display in the second environment,
the determining of the second FOV comprises determining the second FOV based on the location of the user relative to the display,
the transforming of the first multimedia data further comprises performing one or more of framing, cropping, panning, scaling and tilting each of the plurality of first video frames to a respective one of a plurality of second video frames based on the second FOV, and
the second multimedia data comprises a second video stream comprising the plurality of second video frames continuous in time.

5. The method of claim 4, wherein:
the position data further comprises a gaze direction of the user relative to the display, and
the determining of the second FOV further comprises determining the second FOV based on the gaze direction of the user relative to the display.

6. The method of claim 3, wherein the first FOV is substantially 180 degrees or 360 degrees in either or both of a horizontal direction and a vertical direction of the first environment.

7. The method of claim 3, wherein:
the second environment comprises a display,
the first multimedia data further comprises a multi-channel audio signal comprising two or more audio channels,
the position data comprises a location of the user relative to the display and a head direction of the user relative to the display, and
the transforming of the first multimedia data further comprises mixing the two or more audio channels based on the location and the head direction.

8. The method of claim 1, wherein:
the camera is located in the first environment,
the position tracker is located in the second environment,
the receiving of the first multimedia data comprises receiving, by a second processor in the second environment, the first multimedia data via a first processor in the first environment and a data link connecting the first processor to the second processor,
the receiving of the position data comprises receiving the position data by the second processor,
the transforming of the first multimedia data comprises transforming the first multimedia data by the second processor, and
the presenting of the second multimedia data comprises presenting the second multimedia data, by the second processor, on a display located in the second environment.

9. The method of claim 1, wherein:
the camera is located in the first environment,
the position tracker is located in the second environment,
the receiving of the first multimedia data comprises receiving the first multimedia data by a first processor in the first environment,
the receiving of the position data comprises receiving, by the first processor, the position data via a second processor in the second environment and a data link connecting between the second processor and the first processor,
the transforming of the first multimedia data comprises transforming the first multimedia data by the first processor, and
the presenting of the second multimedia data comprises:
transmitting, by the first processor, the second multimedia data to the second processor via the data link; and
presenting, by the second processor, the second multimedia data on a display located in the second environment.

10. An apparatus implementable in a local environment, comprising:
a display;
a position tracker capable of generating first position data of a first user and second position data of a second user relative to the display; and
a processor capable of receiving remote data of a remote environment, determining, at a first time, that the first user is a main participant, and transforming the remote data to processed remote data based on the first position data,
wherein the first position data is used based on determining the first user is the main participant, and
wherein, when the processor presents the processed remote data on the display to the first user and the second user, the processed remote data enables the first user and the second user to perceive the remote environment as being separated from the local environment by a physical window of a size of the display.

11. The apparatus of claim 10, further comprising:
a camera capable of generating local data of the local environment, wherein the processor is further capable of transmitting the local data to a receiver via a data link.

12. The apparatus of claim 10, wherein:
the remote data comprises a first video stream comprising a plurality of first video frames continuous in time, each of the plurality of first video frames having a first (field-of-view) FOV, and
the processed remote data comprises a second video stream comprising a plurality of second video frames continuous in time, each of the plurality of second video frames having a second FOV smaller than the first FOV.

13. The apparatus of claim 11, wherein the position data comprises a location of the user relative to the display, and wherein the camera comprises a wide-angle video camera.

14. The apparatus of claim 13, wherein the position data further comprises a gaze direction of the user relative to the display, and wherein the wide-angle video camera comprises a stereoscopic camera, a light-field camera or other types of three-dimensional (3D) camera.

15. An apparatus implementable in a local environment, comprising:
a camera capable of generating local data of the local environment;
a graphics processor capable of transforming the local data to processed local data based on first remote position data of a first remote user relative to a remote display in a remote environment, wherein the remote environment further comprises a second remote user, and wherein the first remote position data is used based on a determination the first remote user is a main participant; and
a data communication processor capable of transmitting the processed local data to a receiver in the remote environment via a data link,
wherein, when the receiver presents the processed local data on the remote display to the first remote user and the second remote user, the processed local data enables the first remote user and the second remote user to perceive the local environment as being separated from the remote environment only by a window of a size of the remote display.

16. The apparatus of claim 15, further comprising:
a local display; and
a local position tracker capable of generating a local position data of a local user relative to the local display,
wherein the data communication processor is further capable of transmitting the local position data to the receiver via the data link.

17. The apparatus of claim 16, wherein:
the data communication processor is further capable of receiving processed remote data of the remote environment, the processed remote data comprising remote data of the remote environment transformed by the receiver based on the local position data,
the data communication processor is further capable of presenting the processed remote data on the local display, and
the processed remote data, when presented on the local display to the local user, enables the local user to perceive the remote environment as being separated from the local environment only by a window of a size of the local display.

18. The apparatus of claim 16, wherein the remote position data comprises a location, a gaze direction, or both, of the remote user relative to the remote display, and wherein the local position data comprises a location, a gaze direction, or both, of the local user relative to the local display.

19. The apparatus of claim 15, wherein the camera comprises a wide-angle video camera having a field-of-view (FOV) of substantially 180 degrees or 360 degrees in either or both of a horizontal direction and a vertical direction of the local environment.

20. The method of claim 1, further comprising:
receiving, from the camera, third multimedia data of the first environment;
determining, at a second time, that the second user is the main participant instead of the first user;
transforming, based on the second position data, the third multimedia data to fourth multimedia data of the first environment, wherein the second position data is used based on identifying the second user as the main participant; and
presenting, on the display in the second environment, the fourth multimedia data to the first user and the second user.

* * * * *